United States Patent [19]
Scott

[11] Patent Number: 5,638,236
[45] Date of Patent: Jun. 10, 1997

[54] TAPE CARTRIDGE HAVING A SINGLE USE CLEANING LEADER WHICH UTILIZES RUPTURABLE POUCHES OF CLEANING SOLVENT

[75] Inventor: Ed Scott, Anaheim Hills, Calif.

[73] Assignees: Sony Corporation, Japan; Sony Trans Com, Inc., Irvine, Calif.

[21] Appl. No.: 232,494

[22] Filed: Apr. 25, 1994

[51] Int. Cl.$^6$ .............................. G11B 5/10; G11B 5/127
[52] U.S. Cl. ............................................. 360/128; 360/137
[58] Field of Search ............................... 360/128, 133, 360/137

[56] References Cited

U.S. PATENT DOCUMENTS

| | | | |
|---|---|---|---|
| 3,779,483 | 12/1973 | Inoune | 242/191 |
| 3,817,437 | 6/1974 | Nagahiro et al. | 226/91 |
| 4,422,119 | 12/1983 | Kawakami et al. | 360/128 |
| 4,893,209 | 1/1990 | Siddiq | 360/128 |
| 5,463,519 | 4/1994 | Dodt et al. | 360/128 |

FOREIGN PATENT DOCUMENTS

| | | | |
|---|---|---|---|
| 53-68214 | 6/1978 | Japan | 360/137 |
| 58-19776 | 2/1983 | Japan | 360/128 |
| 61-192016 | 8/1986 | Japan | 360/128 |
| 63-191311 | 8/1988 | Japan | 360/128 |
| 1122012 | 5/1989 | Japan | 360/128 |

*Primary Examiner*—Robert S. Tupper
*Assistant Examiner*—David D. Davis
*Attorney, Agent, or Firm*—Limbach & Limbach L.L.P.

[57] ABSTRACT

A tape having a first portion (preferably a magnetic tape portion for recording video, audio, or computer data), and a cleaning leader attached to the first portion, and a tape cartridge including such a tape. The leader includes one or more cleaning solvent modules, each of which is preferably a thin pouch containing cleaning solvent designed to rupture when squeezed between rollers of a tape player transport mechanism (or in the tape cartridge). Preferably, several cleaning solvent modules are evenly spaced along the leader, to expose tape player heads to periodic bursts of solvent during cleaning. A leader control mechanism prevents translation of the leader through the player's tape transport mechanism following the first play of the leader therethrough (or the first play therethrough in a particular direction). The leader control mechanism can include a nodule mounted to the leader so that during rewinding of the tape, the nodule will lock into depressions in the reel on which the leader is wound. Alternatively, the leader control mechanism includes catches (which engage a notch or shoulder along the leader), and/or an electrically conductive strip on the magnetic tape (which can be sensed by a sensor in a tape player to enable the player to respond by preventing its tape transport mechanism from transporting the cleaning leader past the heads). The cartridge can include two pressure rollers that are initially held or biased together so as to burst solvent modules of a leader passing between them. A nodule at the trailing end of the leader engages the rollers, and causes the rollers to become permanently separated so that they do not engage the following magnetic tape portion.

43 Claims, 3 Drawing Sheets

5,638,236

TAPE CARTRIDGE HAVING A SINGLE USE CLEANING LEADER WHICH UTILIZES RUPTURABLE POUCHES OF CLEANING SOLVENT

FIELD OF THE INVENTION

The invention pertains to video, audio, and data tape cartridges (also known as tape cassettes), and to tape recorders and players which transport the tape in such cartridges. More particularly, the invention pertains to a video, audio, or data tape cartridge whose tape includes a cleaning leader with burstable cleaning fluid modules for cleaning the heads and tape transport mechanism of a tape recorder or player, and to a mechanism for preventing the cleaning leader from being transported past the heads more than once (or twice).

BACKGROUND OF THE INVENTION

A variety of video, audio, and data tape cartridges (also known as tape cassettes) are in commercial use. Each such tape cartridge includes a magnetic tape wound on a reel, for recording an analog or digital video signal, an analog or digital audio signal, or a digital data signal. A tape cartridge is designed to be inserted in a tape player including a mechanism for transporting the tape past a set of one or more magnetic heads, so that the heads can read a signal prerecorded on the tape or record a signal on the tape.

For convenience, the expression "tape player" is used herein (including in the claims) in a broad sense to denote either a device which reads signals prerecorded on tape (or film), a device which records signals on tape, a device capable of performing both such reading and recording functions, or a tape rewind device. Also for convenience, the term "tape cartridge" is used in a broad sense herein (including in the claims) to denote either a tape cassette or a tape cartridge.

To maintain good quality of playback and recording and to prevent premature wear (and possibly failure) of the heads and tape transport mechanism of a tape player, the heads and tape transport mechanism must be cleaned periodically to remove debris (especially magnetic particles from the surface of the tape) which accumulate on the heads and transport mechanism as tape is transported through the tape player. It is well known that users often neglect to clean tape player heads (and/or tape transport mechanisms) sufficiently frequently. This problem exists, for example, when tape players are installed in a multipassenger vehicle (such as an aircraft) and the driver or crew (e.g., flight crew of an aircraft) neglects to clean the heads (and/or tape transport mechanisms) of the tape players sufficiently frequently.

The inventor has recognized that, in order to provide some means in a tape cartridge for automatically cleaning the heads and/or transport mechanism of a tape player (as the tape in the cartridge is transported through the player), the following problem must be solved: particles removed from the heads and transport mechanism by the cleaning means during the first play of the tape (e.g., particles accumulated on a "cleaning leader" segment of the tape during the first play) must be prevented from being redeposited back onto the head and transport mechanism during second and subsequent plays of the tape.

Until the present invention it was not known how to include a cleaning segment (a "cleaning leader") in the tape of a tape cartridge, for automatically cleaning the heads (and/or transport mechanism) of a tape player which plays the tape, while also preventing the cleaning leader from being transported past the heads more than once, to prevent redeposit of particles accumulated on the cleaning leader during cleaning (and to prevent excessive wear of the tape head by an abrasive cleaning leader).

SUMMARY OF THE INVENTION

A preferred embodiment of the tape cartridge of the invention includes a preferred embodiment of the inventive tape, which has the usual magnetic tape portion (for recording video, audio, and/or computer data) and also a segment known as a "cleaning leader" attached to one end of the magnetic portion. The cleaning leader, which can be attached at either the leading or the trailing end of the magnetic tape portion, includes one or more cleaning solvent modules. Each solvent module is a thin pouch or packet containing a volume of liquid cleaning solvent. The pouch is designed to rupture when the solvent module is squeezed between rollers of a tape player transport mechanism (or rollers in the tape cartridge itself), thereby releasing the cleaning solvent. The portion of the cleaning leader following the ruptured pouch is coated with the released solvent, and cleans the heads and transport mechanism of the player as it is transported in normal fashion (wiped) across the heads and through the transport mechanism.

Preferably, several cleaning solvent modules are evenly spaced along the cleaning leader, to expose the heads to periodic bursts of released solvent during the cleaning process. For convenience, the term "leader" is sometimes used alone in the specification to denote the "cleaning leader" of the invention.

A leader control means is provided for preventing translation of the cleaning leader through the player's tape transport mechanism following the fast "play" of the leader through the transport mechanism (or the first play of the leader through the transport mechanism in a particular direction, which may be the second overall play of the leader through the transport mechanism). The leader control means may be embodied in the tape cartridge itself, or may include a first component in the tape cartridge and a second component in the tape player which interacts with the first component. One embodiment of the leader control means includes a nodule (which is wider than the leader) mounted to the leader at the cleaning leader's trailing end. The extra tension involved in rewinding the tape causes this nodule to lock into one or more depressions in (or holes through) the reel on which the leader is wound. In other embodiments, the leader control means includes one or more protruding catches to engage a notch in the leader (or a shoulder defined by the intersection of the leader and the magnetic tape portion).

It may also be necessary or desirable (for example, in the case of prerecorded tape cartridges) that the leader control means include an electrically conductive strip (e.g., a strip of metal foil) at the end of the magnetic tape portion near its point of attachment to the cleaning leader. Such a conductive strip is useful with a tape player that includes a sensor for sensing proximity of the strip, and a means for responding to sensed proximity of the strip by preventing the tape transport mechanism from transporting the cleaning leader past the heads. Preferably, the sensor is of the type employed in conventional auto-reversing reel-to-reel tape decks for monitoring the current between metal pins which ride against the tape, and detecting a "short-circuit" condition when the conductive strip passes over the metal pins.

In some embodiments, a relatively thick nodule is mounted at the trailing end of the cleaning leader, to separate rollers which have functioned to rupture the solvent modules, and to trigger a latch mechanism for holding these rollers in their separated position (to prevent them from contributing to tape wear during subsequent plays of the tape). The thick nodule (or the latch mechanism) can contribute to latching the cleaning leader onto the take-up reel (following the first play of the cleaning leader through the player's tape transport mechanism), particularly in embodiments in which the cleaning leader is attached to the leading end (the "head end") of the magnetic portion of the tape. For example, the nodule can be wider than the cleaning leader so that the extra tension involved in rewinding the tape would cause the nodule to lock into holes or depressions in the sides of the reel.

In preferred embodiments, the tape cartridge of the invention includes a pair of pressure rollers that are initially held together to exert sufficient force to burst the cleaning solvent modules of a cleaning leader as the cleaning leader passes between them. A thick nodule (preferably made of plastic) at the trailing end of the cleaning leader engages and separates the rollers, and causes biasing springs (or other means) to hold the rollers in a separated (retracted) position in which they do not rub against the tape portion following the nodule.

DESCRIPTION OF THE PREFERRED EMBODIMENTS

Figure 1:
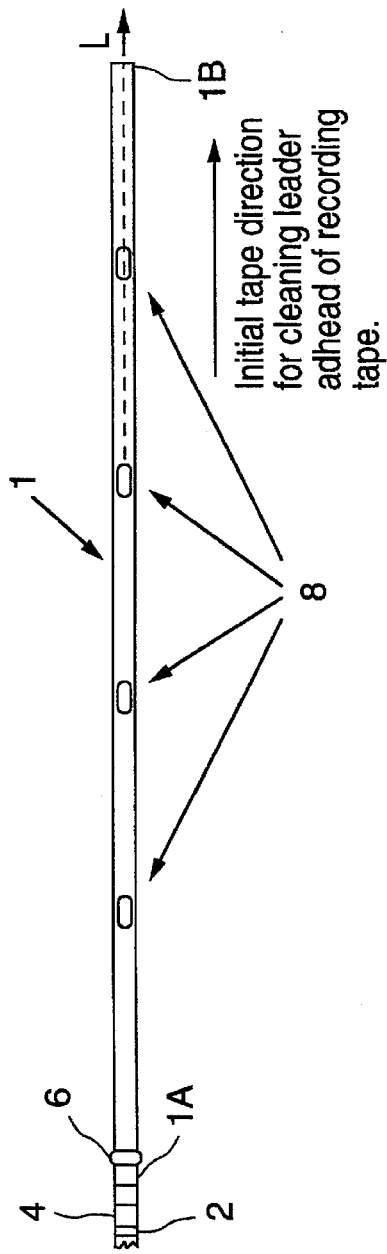
FIG. 1 is an elevational view of a portion of a tape which embodies the invention (and which can be wound in a tape cartridge).

A first embodiment of the tape of the invention will be described with reference to FIG. 1. The tape of FIG. 1 includes cleaning leader portion 1 (sometimes referred to as "cleaning leader" 1), and magnetic tape portion 2. Magnetic tape portion 2 typically has much longer length than cleaning leader 1 (in the direction of the tape's longitudinal axis), so that a large amount of video, audio, or other digital or audio signals can be magnetically recorded thereon. FIG. 1 only shows tape portion 2's end segment, which is attached (e.g., spliced) to end segment 1A of cleaning leader 1. End segment 1B of cleaning leader 1 is the portion of cleaning leader 1 farthest from magnetic tape portion 2.

The tape shown in FIG. 1 is intended to be wound in a tape cartridge so that during the initial play of the tape in a tape player, the tape will translate through the tape player's tape transport mechanism in the initial tape direction shown in FIG. 1 (i.e., toward the right in FIG. 1). This enables cleaning leader 1 to clean one or both of the tape transport mechanism and magnetic heads of the tape player, before magnetic tape portion 2 translates past the heads.

Figure 2:
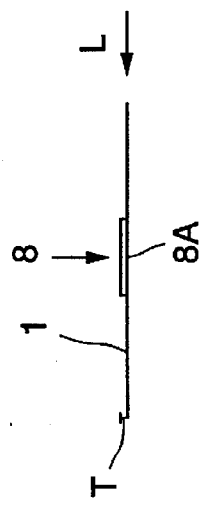
FIG. 2 is a side view of a portion of the tape shown in FIG. 1.

At least one cleaning solvent module 8 is mounted on leader 1, and preferably several identical cleaning solvent modules 8 are mounted at locations (preferably evenly spaced) along leader 1's longitudinal axis L. FIG. 2 is an enlarged side view of one such cleaning solvent module 8. Each cleaning solvent module 8 includes a sealed pouch or packet (referred to below as a "pouch" for simplicity) attached to leader 1 such as by adhesive material, and a volume of cleaning solvent 8A contained within the sealed pouch.

Each pouch of each solvent module has a sufficiently thin wall so that the pouch will rupture easily when squeezed between rollers of a tape cartridge (e.g., rollers 16 and 17 of FIG. 4) or of a tape player's transport mechanism, thereby releasing cleaning solvent 8A. The released solvent 8A will coat the portion of the cleaning leader following the ruptured pouch, and the solvent coating will function to clean the heads (and optionally also the tape transport mechanism) of a tape player as the coated leader is transported in normal fashion (wiped) across the heads and through the transport mechanism. The thickness T (shown in FIG. 2) of each pouch is sufficiently small that the pouches do not interfere with initial winding of the tape on the feed reel (during tape cartridge manufacture). This is one reason for providing many of cleaning solvent modules 8 along cleaning leader 1 (another reason for doing so is discussed below). Also, the wall of each pouch must be sufficiently strong (e.g., thick) so that the pouch will not burst during initial winding of the tape on the feed reel (during tape cartridge manufacture). The modules 8 should be attached to the side of the tape facing away from the tape player heads, so that they do not wear against the heads.

Preferably, several cleaning solvent modules 8 are evenly spaced along cleaning leader 1 to expose the heads to periodic bursts of released solvent during the cleaning process. For convenience, the term "leader" is sometimes used alone in the specification to denote the "cleaning leader" of the invention.

Figure 3:
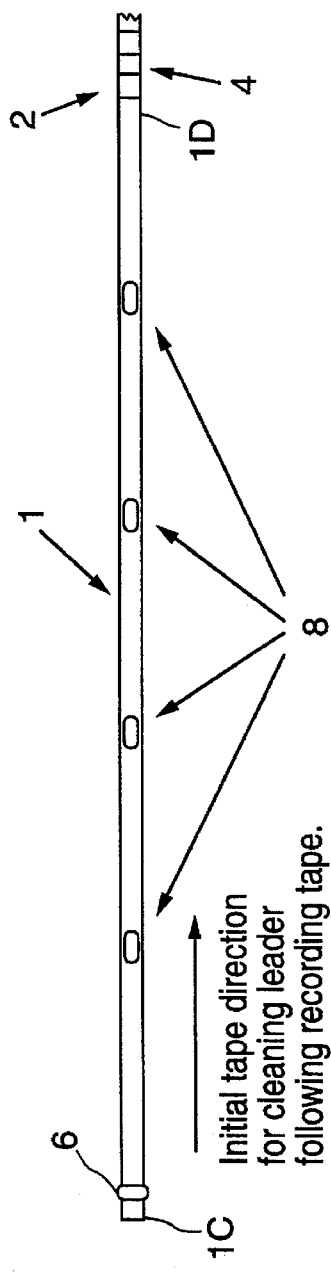
FIG. 3 is an elevational view of a portion of another embodiment of the inventive tape (which can be wound in a tape cartridge).

Next, a second embodiment of the tape of the invention will be described with reference to FIG. 3. The tape of FIG. 3 is identical to the tape in FIG. 1 (although below-described variations on the FIG. 3 tape may differ from below-described variations on the FIG. 1 tape). However, during manufacture of a tape cartridge including the FIG. 3 tape, the FIG. 3 tape is wound on the feed reel of the cartridge so that its cleaning leader 1 is attached to the trailing end of the magnetic tape portion (when the tape is translated in the "initial tape direction" shown in FIG. 3). Thus, when the FIG. 3 tape is first played (translated in the initial tape direction), its magnetic tape portion 2 will pass through the tape player's tape transport mechanism before its cleaning leader 1 does so. FIG. 3 shows only the end segment of tape portion 2 which is attached (e.g., spliced) to end segment 1D of leader 1. End segment 1C of leader 1 of FIG. 3 (the portion of leader 1 farthest from tape portion 2) is attached to the feed reel of a tape cartridge during manufacture of the cartridge.

Advantages of the FIG. 3 embodiment relative to the FIG. 1 embodiment include the following: in the FIG. 1 embodiment, the head cleaning solvent may remain unevaporated in the tape transport mechanism when recordable tape enters the tape transport mechanism; and the additional tension involved in the tape rewind process (in which the tape is transferred from the take-up reel back to the feed reel) may make it easier to catch leader 1 (in the FIG. 3 embodiment) in one of the cartridge reels during a rewind to prevent the leader from passing more than twice through the tape player.

Advantages of the FIG. 1 embodiment relative to the FIG. 3 embodiment include the following: in the FIG. 1 embodiment, the cleaning leader can be controlled so as to pass through a tape transport mechanism only once (whereas the FIG. 3 embodiment would need to pass through the tape transport mechanism twice).

In the case that the FIG. 1 tape is included in tape cartridge, the manufacturer could deliver the cartridges to customers with the cleaning leader already spooled onto the take-up reel. Thus during the initial play of the tape, only the magnetic tape on the feed reel will play through the tape player. Then, during the second play of the tape (when the tape is unwound from the take-up reel and transferred back to the feed reel), the leader will pass through the player's tape transport mechanism after the magnetic tape portion does so.

An important aspect of the invention is a leader control means for preventing translation of leader 1 through the tape transport mechanism of a tape player following the first "play" of leader 1 through the transport mechanism (or the first play of leader 1 through the transport mechanism in a particular direction, which may be the second overall play of leader 1 through the transport mechanism). The leader control means can be embodied in a tape cartridge which contains the tape, or can include a first component in the tape cartridge and a second component in the tape player which interacts with the first component.

One embodiment of the leader control means includes a nodule (e.g., nodule 6 of FIG. 1) and one or more depressions (such as notches 14C of FIG. 5) in, or holes through, a tape reel on which the cleaning leader is wound. For convenience the expression "notch" in a tape reel is used below (including in the claims) in a broad sense denoting a notch or depression extending partially through the reel, or a hole or channel extending completely through the reel. Nodule 6 is wider than the rest of leader 1 (in the vertical direction in FIG. 1), and can attached on (or around) leader 1 at its end 1A (which is leader 1's leading end when the tape is translating toward the left in FIG. 5). Nodule 6 functions after the entire tape (portion 2 as well as leader 1) has translated from the feed reel (e.g., reel 12 of FIG. 4) to the take-up reel (e.g., reel 14 of FIG. 4) of a tape cartridge in the "initial tape direction," and the tape has begun to be rewound back onto the feed reel. During the rewinding operation, the extra tension on the tape causes nodule 6 to lock into one or more depressions or notches in (or holes through) the take-up reel. The roles of the feed and take-up reels can of course be reversed in this operation.

Figure 5:
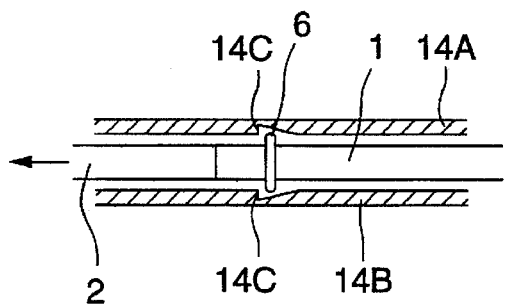
FIG. 5 is an elevational view of a portion of an embodiment of the inventive tape (whose cleaning leader includes a wide nodule), showing the nodule locked between depressions of a reel from which the tape is being unwound.

An example of nodule 6 locked in notches of a reel will be described with reference to FIG. 5. In FIG. 5, the tape being rewound from take-up reel 14 is wrapped around the take-up reel between left sidewall 14A and right sidewall 14B of the take-up reel. The take-up reel has two notches 14C facing each other, one notch 14C in each of sidewalls 14A and 14B near the core of the reel. When the tape is being rewound, nodule 6 will snap into notches 14C and remained locked between them as shown in FIG. 5, thereby preventing the portion of leader 1 which trails nodule 6 from being unwound from reel 14. In alternative embodiments, multiple pairs of notches 14C are provided around the core of the take-up reel.

A variation on the leader control means described with reference to FIGS. 1 and 5 will next be described with reference to FIG. 6. In this embodiment, the leader control means includes a narrow portion 111 of the cleaning leader, and one or more projections (such as one-way catche 114C of FIG. 6 or other one-way grooved catches) which protrude from a tape reel on which the cleaning leader is wound. Narrow portion 111 is narrower than the rest of leader 1 (in the vertical direction in FIG. 6), and is located at leader 1's leading end (the leading end during translation of the tape toward the right in FIG. 6).

Figure 6:
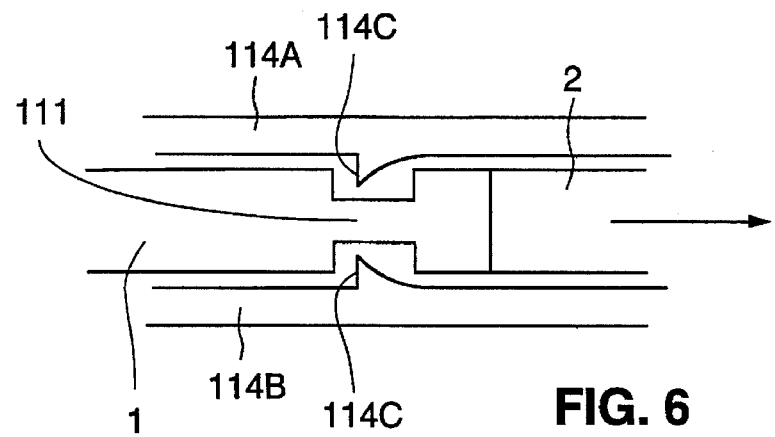
FIG. 6 is a top elevational view of a portion of an embodiment of the inventive tape (whose cleaning leader includes a narrow portion), showing the narrow portion locked by protruding projections of a reel from which the tape is being unwound.

Narrow portion 111 functions after the entire tape has translated from a feed reel (e.g., reel 12 of FIG. 4) to a take-up reel (e.g., the take-up reel comprising left and right reel portions 114A and 114B of FIG. 6) of a tape cartridge and the tape has begun to be rewound back onto the feed reel. During the rewinding operation, narrow portion 11 engage one of the projections protruding from the take-up reel.

FIG. 6 shows narrow portion 111 locked by protruding catches 114C of the take-up reel from which the tape is being unwound. In FIG. 6, the tape being rewound from the take-up reel is wrapped around the take-up reel between left sidewall 114A and fight sidewall 114B of the take-up reel. The take-up reel has two one-way catches 114C facing each other, one protruding from each of sidewalls 114A and 114B. When the tape is being rewound, narrow portion 111 will be caught between projections 114C and remain locked between them as shown in FIG. 6, thereby preventing the portion of leader 1 which trails narrow portion 111 from being unwound from the reel. Preferably, multiple pairs of one-way catches 114C are provided in sidewalls 114A and 114B around the core of the take-up reel.

The roles of the feed and take-up reels can of course be reversed in operation of the FIG. 6 embodiment. For example, when employing the FIG. 3 embodiment of the tape, narrow portion 111 can be included in leader 1 near end 1D (adjacent to magnetic tape portion 2), and one-way catches 114C included in the feed reel rather than the take-up reel. In this case, during initial unwinding of leader 1 from the feed reel, narrow portion 111 will pass by catches 114C (since it translates relative to catches 114C in their non-catching direction). Then, during rewind of the tape back onto the feed reel, narrow portion 111 becomes permanently caught between catches 114C (since it translates relative to catches 114C in their catching direction).

Figure 7:
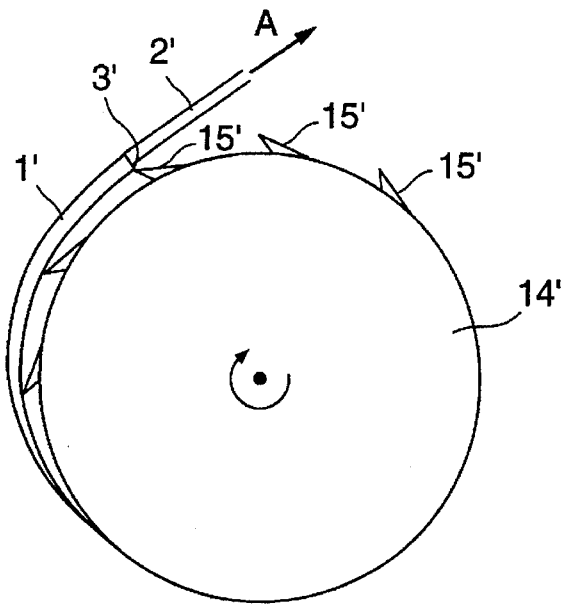
FIG. 7 is a side cross-sectional view of a portion of an embodiment of the inventive tape whose cleaning leader is slightly thicker than the magnetic tape portion, showing the tape locked (at the intersection of its cleaning leader and magnetic tape portion) by protruding projections from the core of a reel from which the tape is being unwound.

Another embodiment of the cleaning leader control means is shown in FIG. 7, for use with an embodiment of the inventive tape which includes a magnetic tape portion 2' and a cleaning leader 1' that is slightly thicker than the magnetic tape portion. The difference in thickness of leader 1' and tape portion 2' of the tape is exaggerated in FIG. 7 for clarity. One-way catches 15' protrude from the core of reel 14' from which the tape is being unwound (in the direction of arrow A) as reel 14' rotates clockwise. The shoulder 3' defined by the intersection of cleaning leader 1' and magnetic tape portion 2' engages one of catches 15' as the tape is being unwound, thereby preventing leader 1' from being unwound from the core of reel 14'.

It may also be necessary or desirable (for example, in the case of a prerecorded tape cartridge) that the inventive leader control mechanism include an electrically conductive strip (e.g., a strip of metal foil) fastened on or around the magnetic tape portion near its point of attachment to the cleaning leader. An example of such a conductive strip is strip 4 shown in FIG. 1. Conductive strip 4 is useful in tape players which include sensor means for sensing its proximity.

Figure 8:
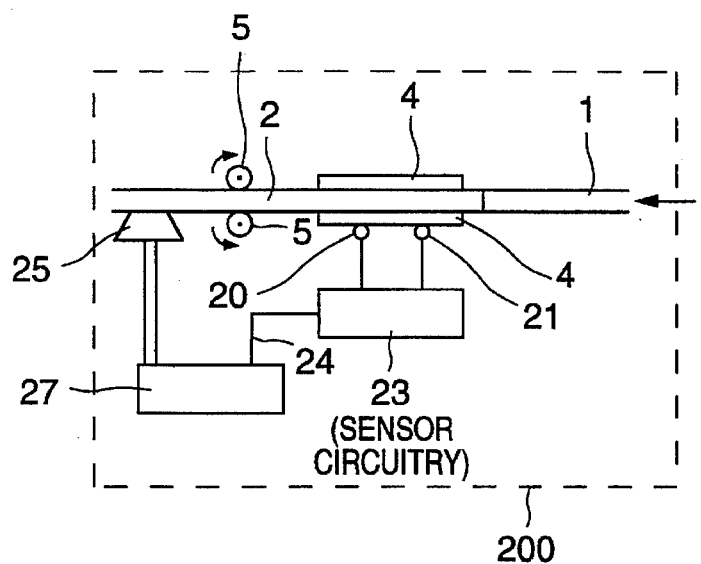
FIG. 8 is a simplified schematic diagram of a tape player including a sensor for sensing proximity of a conductive foil strip on a tape passing through the tape player's tape transport mechanism.

An example of such a tape player will next be described with reference to FIG. 8. Tape player 200 of FIG. 8 includes a sensor means (20, 21, 23) for sensing proximity of electrically conductive strip 4 wrapped around magnetic tape portion 2. The sensor means includes metal pins 20 and 21 which ride against the tape, as rotating rollers 5 (of player 200's tape transport mechanism) pull the tape from right to left through player 200's tape transport mechanism. Pins 20 and 21 are connected to sensor circuitry 23 which generates an output signal indicative of a "short-circuit" condition when conductive strip 4 simultaneously contacts both pins 20 and 21. Circuitry 23 can monitor the electric current flowing from pin 20 to pin 21, so that its output signal can be indicative of a substantial increase in current when both pins 20 and 21 are in contact with conductive strip 4. Tape player 200 also includes circuitry 27, which receives the output of circuitry 23 on line 24, and responds to circuitry 23's output signal (indicative of sensed proximity of strip 4) by preventing the tape transport mechanism from transporting cleaning leader 1 past magnetic head 25. This can be accomplished by causing rollers 5 to cease rotating in response to a particular magnitude of the sensor output signal. Circuitry 27 also includes means for causing head 25 to record data on tape portion 2 (or for causing head 25 to read prerecorded data from tape portion 2.

Use of conductive foil is one of several possible approaches for identifying the magnetic tape-cleaning leader intersection. Another technique would be an optical method wherein a light emitting diode and photo sensor diode or transistor were combined to read bar-code encoded (or otherwise optically encoded) printed reflective striping on the tape. Yet another method would be a transparent section or printed bar-code encoded stripes in a transparent section with light emitter on one side and light sensor on the other side. A short magnetically recorded signal in what would normally be the inter-track gap would be yet another technique for sensing the intersection.

Next, with reference to FIG. 4, tape cartridge 10 which embodies the invention will be described. Tape cartridge 10 includes housing 9, feed reel 12 rotatably mounted in housing 9, take-up reel 14 rotatably mounted in housing 9, and the inventive tape attached between reels 12 and 14. Although either the FIG. 1 or FIG. 3 embodiment of the tape can be included, FIG. 4 assumes that cartridge 10 includes the FIG. 3 tape, and that during manufacture, most of the tape has been wound on feed reel 12. Thus, during the first play of the tape in a tape player, magnetic portion 2 of the tape will translate from reel 12 to reel 14 in the direction of the arrow shown in FIG. 4, and then leader 1 (attached to the trailing end of portion 2) will translate from reel 12 to reel 14.

Tape cartridge 10 is designed for use in a tape player having a tape transport mechanism (which can include rollers 33 and 34). When cartridge 10 is inserted in the tape player, rollers 33 and 34 of the tape transport mechanism engage the tape and cause it to translate as shown.

The cleaning leader (which trails magnetic portion 2 during the first play of the tape) has a set of cleaning solvent modules mounted thereon (each of which can be identical to module 8 of FIG. 2). Roller 16 and roller 17 are rotatably mounted within cartridge 10, and are initially held together by thin connecting member 35 in the position shown in FIG. 4. Roller 16 is attached to one end of pivot arm 38, and the other end of arm 38 is pivotally attached to pivot 36 (which is fixedly attached to cartridge 10). Similarly, roller 17 is attached to one end of pivot arm 39, and the other end of arm 39 is pivotally attached to pivot 37 (which is fixedly attached to cartridge 10). Initially, member 35 holds pressure rollers 16 and 17 together (overcoming the force exerted on arms 38 and 39 by springs 18 and 19 tending to separate the arms from each other) in the position shown in FIG. 4, with sufficient force so that they will burst each cleaning solvent module of the cleaning leader as the cleaning leader passes between the held-together rollers 16 and 17. A thick nodule (e.g., thick nodule 6 of FIG. 3, preferably made of hard plastic) mounted at the trailing end of the cleaning leader will engage rollers 16 and 17 when it has been translated from reel 12 to said rollers by tape player rollers 33 and 34. The force exerted on the rollers by the thick nodule will break member 35, thus causing springs 18 and 19 to pivot arms 38 and 39 away from each other, thereby moving rollers 16 and 17 into a separated (retracted) position in which they do not touch the tape. After member 35 has been broken, springs 18 and 19 will maintain rollers 16 and 17 away from each other in their retracted position.

Figure 4:
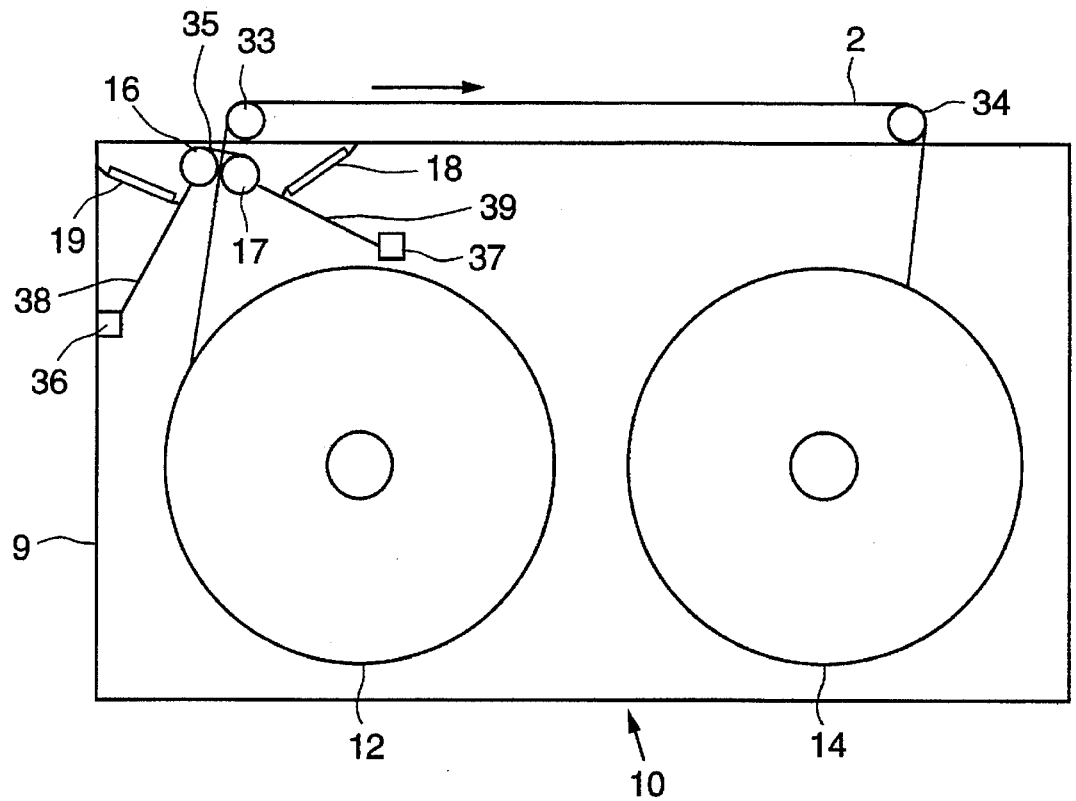
FIG. 4 is a cross-sectional view of a tape cartridge which embodies the invention.

In a variation on this embodiment, elements 19, 36, and 38 are omitted, and roller 16 is replaced by a roller fixedly mounted near the outside surface of cartridge 10 (e.g., in the position of roller 16 shown in FIG. 4). In such variation too, a thick nodule on the tape bursts member 35 as the nodule passes between the fixed roller and roller 17, allowing spring 18 to pivot arm 39 and roller 17 into a separated (retracted) position in which the fixed roller and roller 17 do not touch each other or the tape. After member 35 has been broken, spring 18 will maintain the rollers away from each other in the separated position.

Nodule 6 of the tape of either FIG. 1 or FIG. 3 should be thicker (in the direction out of the plane of FIGS. 1 or 3) than the portions of leader 1 away from nodule 6 and the solvent modules 8, and should be sufficiently thick (in this direction) to function as a roller-separation nodule as described with reference to FIG. 4. If nodule 6 is also sufficiently wide (in the vertical direction in of the plane of FIGS. 1 or 3), it can also function as described with reference to FIG. 5. However, the roller-separation nodule of the invention need not have greater width than the rest of the cleaning leader (if not, it will not function as part of the leader control means described with reference to FIG. 5).

It is also within the scope of the invention to clean a tape player at its optimal cleaning frequency as follows. For specificity, we assume that the desired cleaning frequency of the tape player is one cleaning for each of Z tape plays in the player, and that Z is the product of two factors X and Y. Z may be a relatively low number such as 30 (with X=3 and Y=10) or a relatively high number such as 300 (with X=30 and Y=10). In the case that a sequence of tapes is played in the player, where each of the tapes is played an average of X times, then accordance with the invention, some of the tapes should be of the inventive type (including a magnetic tape portion attached to a cleaning leader having at least one cleaning solvent module) and the others should be of a conventional type (including a magnetic tape portion but no such cleaning leader). Since each of the inventive tapes will clean the player only during a single play (typically the fast play, but sometimes the second play), it is preferred that an average of one of every Y of the tapes is of the inventive type. Thus the player will be cleaned, on the average, once per each (X)(Y)=Z tape plays, since one of the inventive tapes will be played each Y plays on average, and one of each X plays of the inventive tape will clean the player on average.

This cleaning method is particularly useful in a passenger vehicle (or other environment) in which tape player users borrow (or rent or buy) tapes from a tape library or collection, and each borrowed, rented, or purchased tape is played on one of a collection of tape players. If the users behave predictably (on average), by choosing tapes of different titles with predictable different frequencies, then the tape players can be cleaned at their optimal frequency by providing the library (or collection) with the proper mix of tapes of the inventive type and of conventional type.

Figure 9:
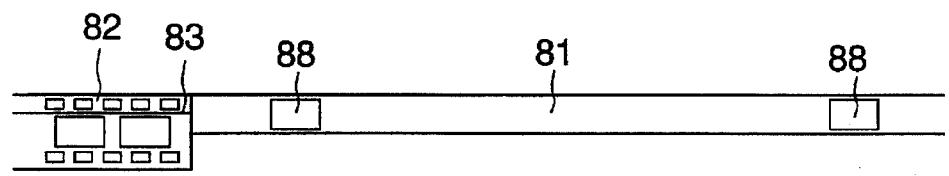
FIG. 9 is an elevational view of a portion of a motion picture film (referred to herein as a "tape") which embodies the invention.

It is contemplated that a tape embodying the invention may be a motion picture film having a soundtrack, such as the tape shown in FIG. 9, which comprises motion picture film portion 82 (including soundtrack 83) and cleaning leader 81 attached to one end of film portion 82. The inventive cleaning leader 81 is attached to one end of soundtrack 83 so that the solvent module(s) 88 thereof can be burst by the device for reading the soundtrack (to enable the device to be cleaned as the cleaning leader is translated through it).

Other embodiments of the inventive tape are tapes with multiple sections of cleaning leader separated by optically readable bar-code stripes (or other optical encoding data) numbering the sections. Each time such a tape was played the player equipment could record a play count at the end of the tape. A microprocessor in the player would sense this play count data and on every modulo N play perform a cleaning cycle using an as yet unused section of cleaning leader. The following example shows plays versus section cleaning leader used where modulo 5 cleaning was performed:

| | | |
|---|---|---|
| 1st play | cleaning tape mechanism bursts the fluid pouch(es) of cleaning leader section 1 | |
| 2nd play | no cleaning | |
| 3rd play | no cleaning | |
| 4th play | no cleaning | |
| 5th play | no cleaning | |
| 6th play | clean tape mechanism bursts the fluid pouch(es) of cleaning leader sections 1 and 2 (section 2 having cleaning solvent) | |
| 7th play | no cleaning | |
| 8th play | no cleaning | |
| 9th play | no cleaning | |
| 10th play | no cleaning | |
| 11th play | clean tape mechanism bursts the fluid pouch(es) of cleaning leader sections 1, 2 and 3 (section 3 having cleaning solvent) | |
| 12 play | no cleaning | |

The latter embodiments would be useful for tapes such as airline safety tapes which are used repeatedly in the same player mechanism.

In other embodiments, recorded and re-recorded signals on the tape can manage the closed/open state of the cleaning solvent pouch bursting rollers. For example, a tape night be initially received from the manufacturer with a "close rollers" signal recorded at one end of the magnetic tape portion of the tape. Upon executing a cleaning cycle, this section would be re-recorded to the "open roller" state.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A magnetic tape, for use in a tape player having a tape transport mechanism, the tape cartridge including:

a signal portion; and a cleaning leader attached to a first end of the signal portion, the cleaning leader having a cleaning solvent module mounted thereon at a first location, said cleaning solvent module including a sealed pouch and cleaning solvent within the sealed pouch, the sealed pouch rupturable upon passage of the cleaning leader through said a tape transport mechanism of said a tape player.

2. The tape of claim 1, wherein the signal portion is a magnetic tape, and wherein the magnetic tape and the cleaning leader are dimensioned for use in a tape cartridge.

3. The tape of claim 1, wherein the signal portion is a medium for recording audio and/or video signals.

4. The tape of claim 1, wherein the signal portion is a film having a soundtrack recorded thereon.

5. The tape of claim 1, wherein the cleaning leader also includes:

a second cleaning solvent module mounted thereon at a second location separated from the first location, where the second cleaning solvent module is substantially identical to the cleaning solvent module.

6. The tape of claim 1, wherein the cleaning leader has a longitudinal axis and a first width in a first direction perpendicular to the longitudinal axis, and wherein the cleaning leader also includes:

a narrow portion having a second width in the first direction, where the second width is less than the first width.

7. A tape cartridge for use in a tape player having a tape transport mechanism, the tape cartridge including:

a housing;

a first reel rotatably mounted in the housing;

a second reel rotatably mounted in the housing; and a tape having a first end attached to the first reel and a second end attached to the second reel, said tape having at least a portion pre-wound on the first reel, wherein the tape includes a magnetic tape portion and a cleaning leader, where a connection end of the cleaning leader is attached to a connection end of the magnetic tape portion, where the cleaning leader has a cleaning solvent module mounted thereon at a first location, and where the cleaning solvent module includes a sealed pouch and cleaning solvent within the sealed pouch, the sealed pouch rupturable upon passage of the cleaning leader through a tape transport mechanism of a tape player.

8. The tape cartridge of claim 7, wherein substantially all of the tape is prewound on the first reel, and the magnetic tape portion of the tape is between the cleaning leader and the first end, so that the cleaning leader will pass through the tape transport mechanism before the magnetic tape portion does, when the tape is first played in the tape player.

9. The tape cartridge of claim 7, wherein substantially all of the tape is prewound on the first reel, and the cleaning leader is between the magnetic tape portion of the tape and the first end, so that the magnetic tape portion will pass through the tape transport mechanism before the cleaning leader does, when the tape is first played in the tape player.

10. The tape cartridge of claim 7, also including:

leader control means initially configured in a first position allowing free translation of the cleaning leader between the first reel and the second reel, wherein the leader control means is switchable from the first position to a second position preventing longitudinal translation of the connection end of the cleaning leader from a position near one of the first reel and the second reel.

11. The tape cartridge of claim 10, wherein the leader control means also includes:

means for switching the leader control means from the first position to the second position after the connection end of the cleaning leader has translated in one direction at least partially from one to another of the first reel and the second reel.

12. The tape cartridge of claim 10, wherein at least one of the first reel and the second reel has a surface defining a notch, and wherein the leader control means includes:

a nodule mounted to the cleaning leader at one end thereof so as to protrude from the cleaning leader, wherein the nodule is dimensioned to snap into the notch in response to exertion of sufficient force on the cleaning leader in a first direction, and wherein the leader control means is in said second position when the nodule has been snapped into the notch.

13. The tape cartridge of claim 10, wherein the leader control means includes:

an electrically conductive strip mounted to the magnetic tape portion near the connection end of said magnetic tape portion.

14. The tape cartridge of claim 10, wherein the tape has a narrow portion, and at least one of the first reel and the second reel has one-way catches for engaging with and locking to the narrow portion when the tape translates in a first direction relative to said one-way catches.

15. The tape cartridge of claim 10, wherein the leader control means includes a first locking means mounted to the tape, and a second locking means mounted away from the tape in the tape cartridge, wherein the second locking means interacts with the first locking means.

16. The tape cartridge of claim 7, also including:

leader control means initially configured in a first position allowing free translation of the cleaning leader between the first reel and the second reel, wherein the leader control means is switchable from the first position to a second position preventing translation of the connection end of the cleaning leader away from a position near one of the first reel and the second reel; and means for switching the leader control means from the first position to the second position after the connection end of the cleaning leader has translated once from the first reel to the second reel.

17. The tape cartridge of claim 7, wherein the cleaning leader also has a second cleaning solvent module mounted thereon at a second location separated from the first location.

18. A tape player and tape cartridge assembly, including:

a tape player having a tape transport means and a magnetic head; and a tape cartridge positioned in the tape player, wherein the tape cartridge includes:

a housing;

a first reel rotatably mounted in the housing;

a second reel rotatably mounted in the housing; and a tape having a first end attached to the first reel and a second end attached to the second reel, said tape having at least a portion pre-wound on the first reel, wherein the tape includes a magnetic tape portion and a cleaning leader, where a connection end of the cleaning leader is attached to a connection end of the magnetic tape portion, where the cleaning leader has a cleaning solvent module mounted thereon at a first location, and where the cleaning solvent module includes a sealed pouch and cleaning solvent within the sealed pouch, the sealed pouch rupturable upon passage of the cleaning leader through the tape transport means of the tape player.

19. The assembly of claim 18, wherein the tape cartridge also includes:

leader control means initially configured in a first position allowing free translation of the cleaning leader between the first reel and the second reel, wherein the leader control means is switchable from the first position to a second position preventing translation of the connection end of the cleaning leader from a position near one of the first reel and the second reel; and means for switching the leader control means from the first position to the second position after the connection end of the cleaning leader has translated in one direction at least partially from one to another of the first reel and the second reel.

20. The assembly of claim 18, also including:

a first leader control means in the tape cartridge and a second leader control means mounted in the tape player, wherein the second leader control means is initially in a first configuration allowing translation of the cleaning leader through the tape transport means between the first reel and the second reel, and wherein the second leader control means includes means for interacting with the first leader control means to switch the second leader control means from the first configuration to a second configuration preventing translation of the cleaning leader through the tape transport means past the magnetic head.

21. The assembly of claim 20, wherein the first leader control means includes an electrically conductive strip mounted to the magnetic tape portion near the connection end thereof, and wherein the second leader control means includes means for sensing proximity of the electrically conductive strip.

22. A method for cleaning a tape player by playing a tape therein, comprising the steps of:

(a) providing a tape which includes a magnetic tape portion and a cleaning leader, the cleaning leader including a connection end attached to a connection end of the magnetic tape portion, the tape including at least one cleaning solvent module mounted on the cleaning leader, the cleaning solvent module having a sealed pouch and cleaning solvent within the sealed pouch, and further providing a tape player having a tape transport means and a magnetic head;

(b) during an initial play of the tape, allowing both the magnetic tape portion and the cleaning leader to translate through the tape transport means, between a pair of spaced bodies, and past the magnetic head, causing rupture of the sealed pouch between the spaced bodies; and (c) during subsequent plays of the tape, allowing only the magnetic tape portion to translate through the tape transport means past the magnetic head.

23. The method of claim 22, wherein the tape is mounted in a tape cartridge, where the tape cartridge includes a housing and a first reel and a second reel rotatably mounted in the housing, and where the tape is attached between the first reel and the second reel with at least a portion of the tape prewound on the first reel.

24. The method of claim 23, wherein step (c) includes the steps of:

during a second play of the tape, allowing both the magnetic tape portion and the cleaning leader to translate through the tape transport means past the magnetic head; and during all subsequent plays of the tape after the second play, allowing only the magnetic tape portion to translate through the tape transport means past the magnetic head.

25. The method of claim 23, wherein step (c) includes the steps of:

during all subsequent plays of the tape after the initial play, allowing only the magnetic tape portion to translate through the tape transport means past the magnetic head.

26. The method of claim 23, where a desired cleaning frequency of the tape player is one cleaning for each Z tape plays, where Z=(X)(Y), and X, Y, and Z are numbers, also including the step of:

playing a sequence of tapes in the tape player, wherein each of the tapes is played an average of X times, wherein each of the tapes belongs to one of a first type and a second type, wherein an average of one of every Y of the tapes is of the first type, wherein each of the tapes of the first type includes a magnetic tape portion and a cleaning leader attached to the magnetic tape portion, each said cleaning leader having at least one cleaning solvent module mounted thereon, and wherein each of the tapes of the second type includes a magnetic tape portion but no cleaning leader.

27. A tape cartridge for use in a tape player having a tape transport mechanism, the tape cartridge including:

a housing;

a first reel rotatably mounted in the housing;

a second reel rotatably mounted in the housing; and a tape having a first end attached to the first reel and a second end attached to the second reel, said tape having at least a portion prewound on the first reel, wherein the tape includes a magnetic tape portion having a connection end and a cleaning leader having a connection end attached to the connection end of the magnetic tape portion, the cleaning leader having a longitudinal axis and a first thickness in a first direction perpendicular to the longitudinal axis, the cleaning leader including a cleaning solvent module mounted thereon at a first location, where the cleaning solvent module includes a sealed pouch and cleaning solvent within the sealed pouch, and a roller-separation nodule mounted to the cleaning leader at an end thereof, where the roller-separation nodule has a nodule thickness in the first direction greater than the first thickness;

a pair of rollers in a first configuration in the housing for squeezing the cleaning leader as the cleaning leader translates between them, thereby rupturing the solvent modules; and means for mounting the rollers in the housing, wherein the means for mounting includes means for moving the rollers into a second configuration in response to translation of the roller-separation nodule between the rollers in the first configuration and maintaining the rollers in the second configuration when they have reached said second configuration, wherein the rollers are separated from each other in said the configuration.

28. The tape cartridge of claim 27, also including:

leader control means initially configured in a first position allowing free translation of the cleaning leader between the first reel and the second reel, wherein the leader control means is switchable from the first position to a second position preventing translation of the connection end of the cleaning leader from a position near one of the first reel and the second reel.

29. The tape cartridge of claim 28, wherein the leader control means also includes:

means for switching the leader control means from the first position to the second position after the connection end of the cleaning leader has translated in one direction at least partially from one to another of the first reel and the second reel.

30. The tape cartridge of claim 28, wherein at least one of the first reel and the second reel has a surface defining a notch, and wherein the leader control means includes:

a nodule mounted to the cleaning leader at one end thereof so as to protrude from the cleaning leader, wherein the nodule is dimensioned to snap into the notch in response to exertion of sufficient force on the cleaning leader in a first direction, and wherein the leader control means is in said second position when the nodule has been snapped into the notch.

31. The tape cartridge of claim 28, wherein the leader control means includes:

an electrically conductive strip mounted to the magnetic tape portion near the connection end of said magnetic tape portion.

32. The tape cartridge of claim 28, wherein the tape has a narrow portion, and at least one of the first reel and the second reel has one-way catches for engaging with and locking to the narrow portion when the tape translates in a first direction relative to said one-way catches.

33. The tape cartridge of claim 27, wherein the leader control means includes a first locking means mounted to the tape, and a second locking means mounted away from the tape in the tape cartridge, wherein the second locking means interacts with the first locking means.

34. A tape cartridge for use in a tape player having a tape transport mechanism, the tape cartridge including:

a housing;

a first reel rotatably mounted in the housing;

a second reel rotatably mounted in the housing;

a tape having a first end attached to the first reel and a second end attached to the second reel, said tape having at least a portion prewound on the first reel, the tape including a magnetic tape portion and a cleaning leader, where a connection end of the cleaning leader is attached to a connection end of the magnetic tape portion, where the cleaning leader has a cleaning solvent module mounted thereon at a first location, and where the cleaning solvent module includes a sealed pouch and cleaning solvent within the sealed pouch; and a pair of rollers mounted in the housing, each roller on an opposite side of the tape from the other roller, the rollers spaced for squeezing the cleaning leader as the cleaning leader translates between them, thereby rupturing the solvent modules.

35. The tape cartridge of claim 34, also including:

leader control means initially configured in a first position allowing free translation of the cleaning leader between the first reel and the second reel, wherein the leader control means is switchable from the first position to a second position preventing translation of the connection end of the cleaning leader from a position near one of the first reel and the second reel.

36. The tape cartridge of claim 35, wherein the leader control means also includes:

means for switching the leader control means from the first position to the second position after the connection end of the cleaning leader has translated in one direction at least partially from one to another of the first reel and the second reel.

37. The tape cartridge of claim 35, wherein at least one of the first reel and the second reel has a surface defining a notch, and wherein the leader control means includes:

a nodule mounted to the cleaning leader at one end thereof so as to protrude from the cleaning leader, wherein the nodule is dimensioned to snap into the notch in response to exertion of sufficient force on the cleaning leader in a first direction, and wherein the leader control means is in said second position when the nodule has been snapped into the notch.

38. The tape cartridge of claim 35, wherein the leader control means includes:

an electrically conductive strip mounted to the magnetic tape portion near the connection end of said magnetic tape portion.

39. The tape cartridge of claim 35, wherein the tape has a narrow portion, and at least one of the first reel and the second reel has one-way catches for engaging with and locking to the narrow portion when the tape translates in a first direction relative to said one-way catches.

40. The tape cartridge of claim 34, wherein the leader control means includes a first locking means mounted to the tape, and a second locking means mounted away from the tape in the tape cartridge, wherein the second locking means interacts with the first locking means.

41. A method for cleaning a tape player by playing a tape therein, comprising the steps of:

(a) providing a tape which includes a signal portion and a cleaning leader, the cleaning leader including a connection end attached to a connection end of the signal portion, the tape including at least one cleaning solvent module mounted on the cleaning leader, the cleaning solvent module having a sealed pouch and cleaning solvent within the sealed pouch, and further providing a tape player having a tape transport means and a magnetic head; and (b) operating the tape transport means, causing the cleaning leader to translate through the tape transport means and past the magnetic head, causing rupture of the sealed pouch.

42. The method of claim 41 further comprising the step of:

(c) operating the tape transport means to cause the signal portion to pass through the tape transport means past the magnetic head thereby causing the tape to play.

43. The method of claim 42 wherein during an initial play of the tape steps (a), (b) and (c) are carried out and wherein during subsequent plays of the tape steps (a) and (c) are carried out.

* * * * *